(No Model.) 4 Sheets—Sheet 1.
G. H. LASAR.
BARBED WIRE MACHINE.
No. 296,190. Patented Apr. 1, 1884.
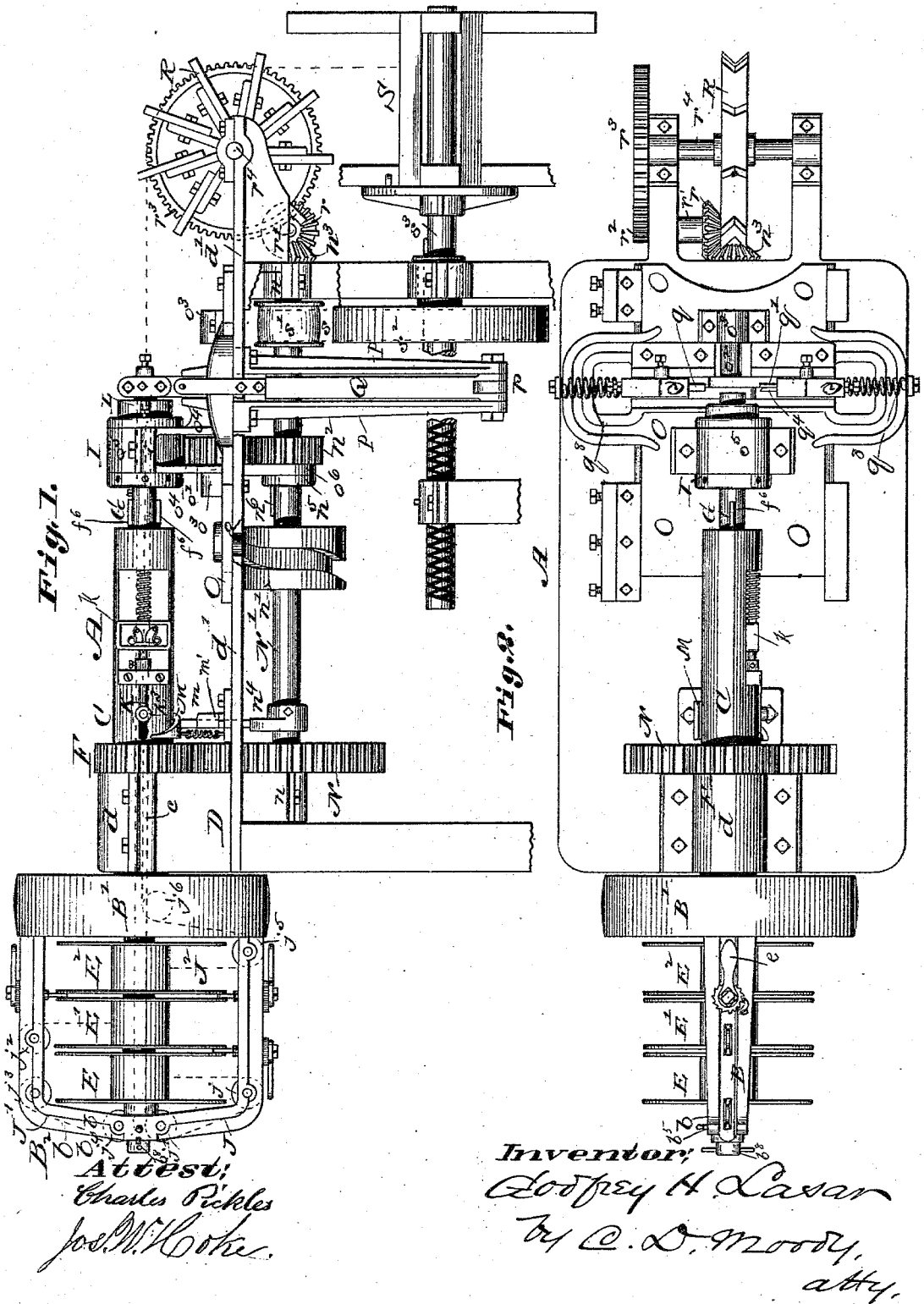
Attest:
Charles Pickles
Jos. W. Cooke
Inventor:
Godfrey H. Lasar
by C. D. Moody,
atty.

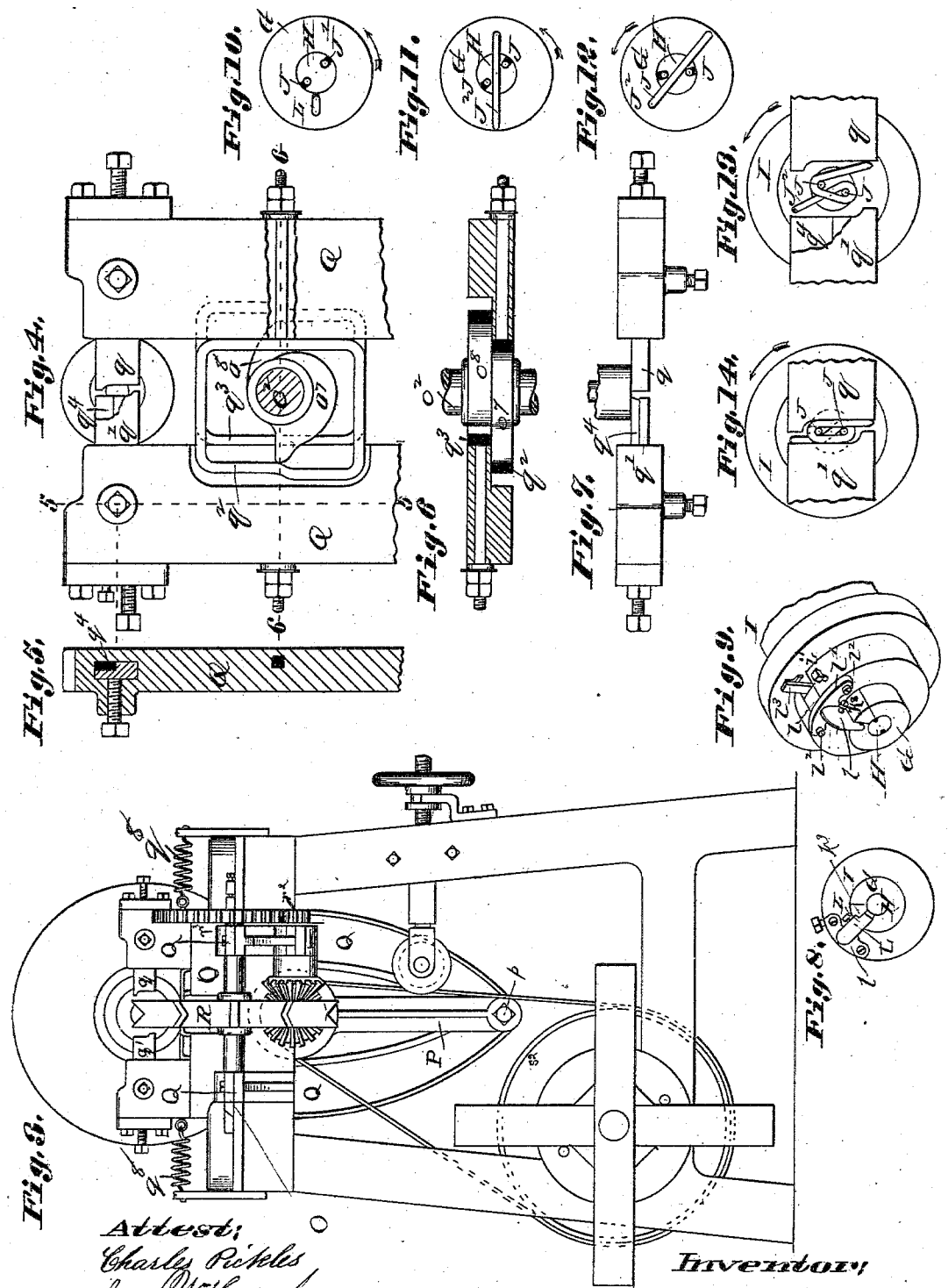

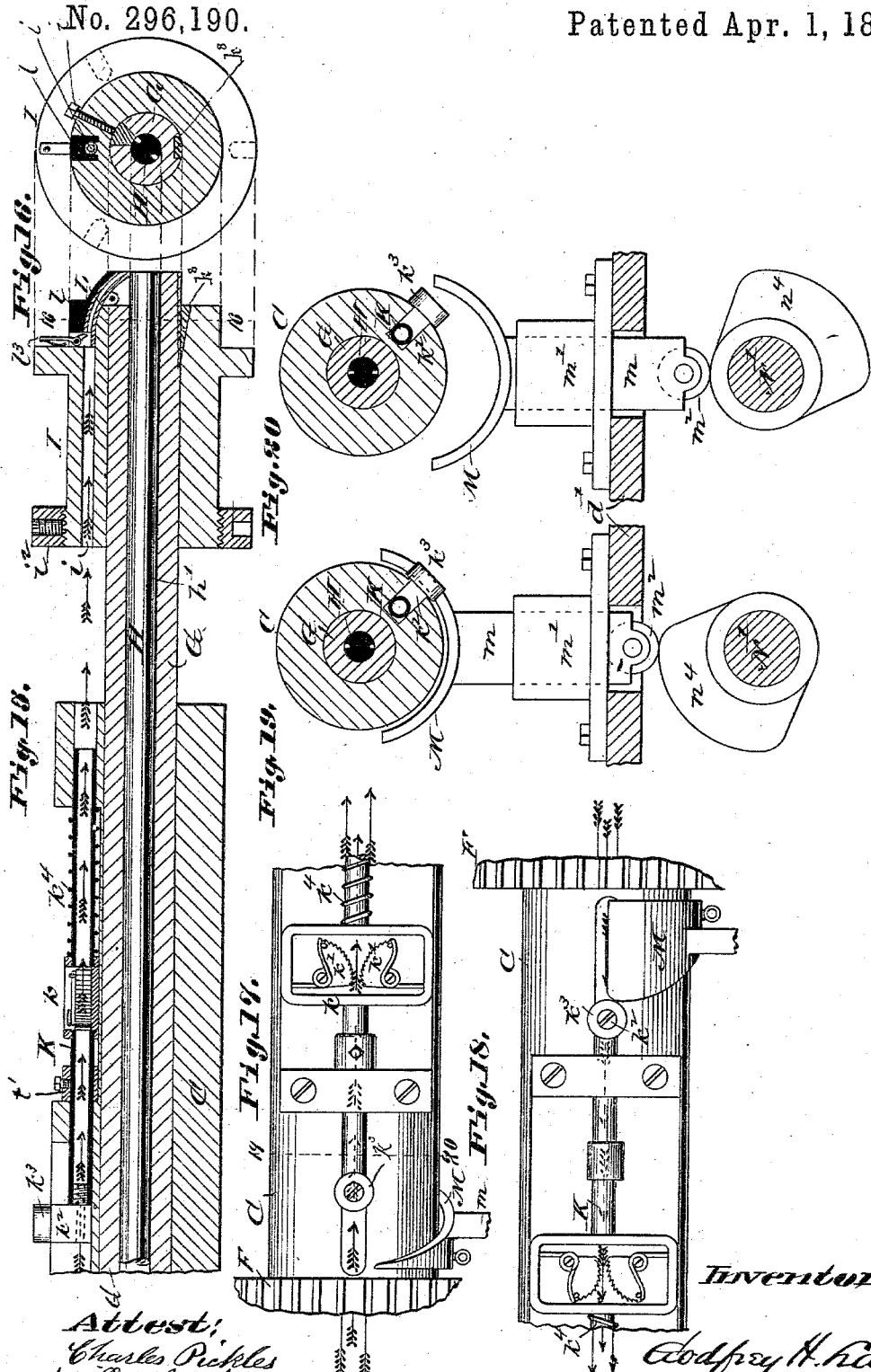

(No Model.)
4 Sheets—Sheet 4.
G. H. LASAR.
BARBED WIRE MACHINE.
No. 296,190. Patented Apr. 1, 1884.
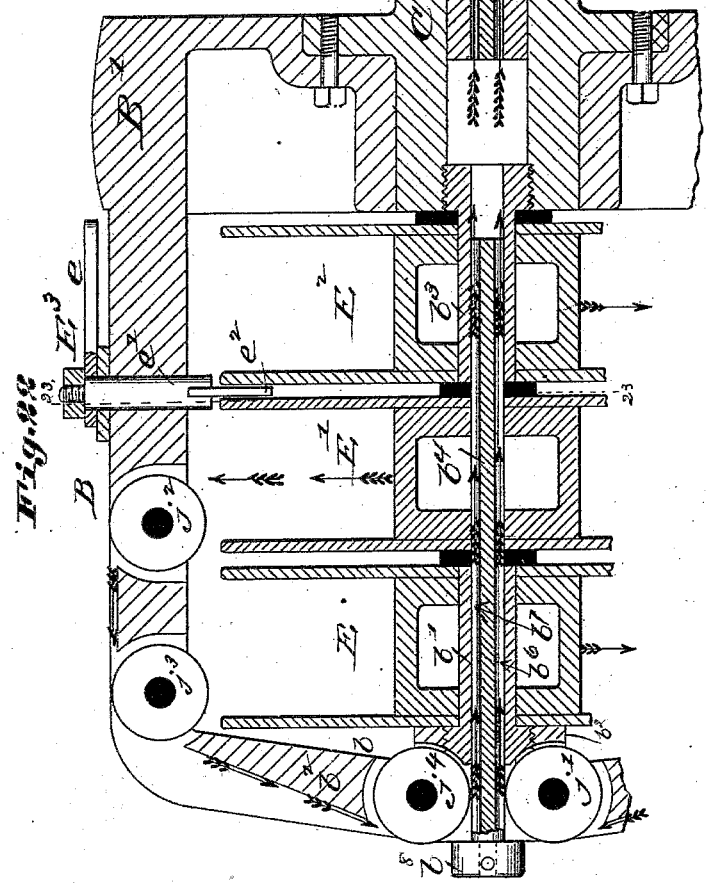
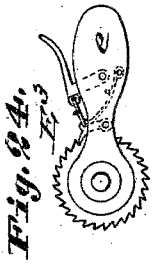
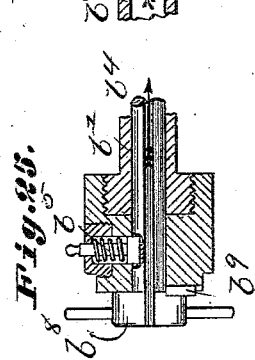
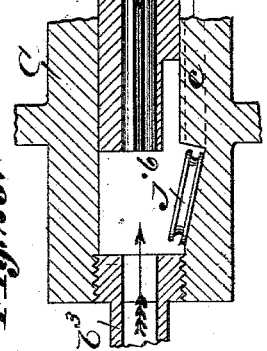
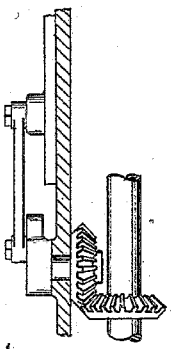
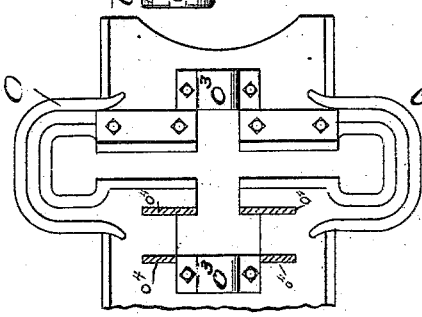

UNITED STATES PATENT OFFICE.

GODFREY H. LASAR, OF ST. LOUIS, MISSOURI.

BARBED-WIRE MACHINE.

SPECIFICATION forming part of Letters Patent No. 296,190, dated April 1, 1884.

Application filed March 2, 1883. (No model.)

*To all whom it may concern:*

Be it known that I, GODFREY H. LASAR, of St. Louis, Missouri, have made a new and useful Improvement in Barbed-Wire Machines, of which the following is a full, clear, and exact description, reference being had to the annexed drawings, making a part of this specification, in which—

Figure 1 is a side elevation of the improved machine; Fig. 2, a plan, and Fig. 3 the rear end elevation; Fig. 4, an elevation showing the upper ends of the compressor-arms and the mechanism immediately therewith connected, a portion of one of the compressors being broken away to show the knife attached to the compressor; Fig. 5, a section on the line 5 5 of Fig. 4; Fig. 6, a section on the line 6 6 of Fig. 4; Fig. 7, a plan of the compressors; Fig. 8, the rear end elevation of the core, barrel, and head, the head-collar being omitted; Fig. 9, a view in perspective showing the rear end of the core, barrel, and head; Fig. 10, the rear end elevation of the core and barrel; Fig. 11, a similar elevation, the barb-wire being in position to be attached; Fig. 12, a view similar to that of Figs. 10, 11, but showing the parts turned round to bring the barb into position to be acted upon by the right-hand (as shown in Fig. 13) compressor; Fig. 13, a similar elevation, showing also the compressors and head, and the barb-wire intertwined upon the strand-wires and ready to be severed and compressed; Fig. 14, a view similar to that of Fig. 13, but showing the compressors closed to compress the barb-wire upon the strand-wires; Fig. 15, a longitudinal section taken through the barrel and parts immediately therewith connected; Fig. 16, a section on the line 16 16 of Fig. 15; Fig. 17, a plan of the inner or front end of the barrel-stock; Fig. 18, a similar plan (turned around) showing the opposite side of the barrel-stock; Fig. 19, a section on the line 19 20 of Fig. 17; Fig. 20, a section similar to that of Fig. 19, the cam being dropped; Fig. 21, a plan of the slide; Fig. 22, a longitudinal section of the flier in part; Fig. 23, a section on the line 23 23 of Fig. 22; Fig. 24, a plan of the tension device; Fig. 25, a longitudinal section taken through the center of the front end of the flier; Fig. 26, a longitudinal section of the forward end of the barrel-stock, the section being in a plane at right angles to the section of Fig. 22; and Fig. 27, a sectional detail, showing a modification of the mechanism for moving the head-slide.

The same letters of reference denote the same parts.

The improvement relates to that portion of the construction immediately associated with the core, barrel, and barrel-stock; to the mechanism for feeding the barb-wire; to the means for moving the head longitudinally upon the barrel; to the construction of the head; to the means for preventing the wire from slipping backward; to the device for guiding the barb-wire between the strand-wires; to the means for compressing the barb-wire upon the strand-wires, and to the combination of the various features above described.

Considered generally, the machine, in its construction and operation, is as follows: The two strand-wire reels and also the barb-wire reel are all held centrally in the same flier, which is attached to a stock that rotates in a suitable bearing. The stock contains a barrel, and the barrel in turn contains a core. The strand-wires are fed centrally through the flier and reels, and thence through the core. The barb-wire is fed through and along the stock, and thence through the head upon the rear end of the barrel, and thence across the rear end of the head, barrel, and core, passing between the strand-wires. A pair of compressors, attached, respectively, to a pair of hinged arms, are made to close toward each other as the barb-wire passes between the strand-wires and assist in the intertwining of the barb and strand wires. The compressors are then moved nearer together, causing the barb-wire to be severed and the barb to be tightly compressed and set upon the strands. The barbed wire is carried over a sprocket-wheel and wound upon a spool. The head has a reciprocating longitudinal movement with the barrel, to enable the barbs to be formed without arresting the movements of the various wires through the machine.

A represents the improved machine.

B represents the flier. The flier is attached, as seen more distinctly in Fig. 22, to the stock C, which is held and adapted to be rotated in the bearing $d$ of the frame D of the machine.

E E' E² respectively represent the two strand-wire reels and the barb-wire reel. They are all held centrally in the flier and side by side, the two strand-wire reels E E' being next to the front end, $b$, of the flier, and the barb-wire reel E² beyond the other reels.

The mode of supporting the reels in the flier is as follows: A tube, $b'$, is screwed into the cross-bar $b^2$ at the front end of the flier, and another tube, $b^3$, is screwed into the stock C. The tubes $b'$ $b^3$ are in line with each other, and are spaced apart from each other sufficiently to admit the middle reel, E'. A core-bar, $b^4$, is held in the tubes $b'$ $b^3$. The reel E is held upon the tube $b'$, the reel E² is held upon the tube $b^3$, and the reel E' is held upon the core-bar $b^4$. The reels E E² are first hung in place upon the tubes $b'$ $b^3$. The middle reel, E', is then brought into line with the other reels, and then the core-bar $b^4$ is slipped into the tube $b'$, reel E', and tube $b^3$, substantially as shown in Fig. 22. The core-bar is held in place by means of the spring-catch $b^5$.

To remove the reels, the core-bar is withdrawn, and the middle reel first withdrawn from the flier, and afterward the other reels. The core-bar $b^4$ is grooved longitudinally at $b^6$ $b^7$ to receive the strand-wires. The grooves extend entirely through the core-bar and hand-wheel $b^8$. As the grooves $b^6$ $b^7$ must always be respectively in coincidence with the grooves, hereinafter described, in the core, the flier is provided with a projection, $b^9$, and the head or hand wheel of the core-bar has a corresponding notch. The projection, notch, and grooves $b^6$ $b^7$ are relatively properly adjusted, and by turning the core-bar to bring the notch into engagement with the projection the core-bar can be readily fitted.

Motion is communicated to the machine by means of the pulley B', which is preferably made in one piece with the flier B, and, more strictly speaking, it is the pulley which is immediately attached to the stock C, and on imparting motion to the pulley, the latter, the flier, the reels, and the stock are rotated as one part in the bearing $d$. The stock C extends toward the rear end of the machine, substantially as shown in Figs. 1 and 2. The stock is provided with a gear, F, Figs. 1, 2, 17, 18. The bearing $d$ is between the pulley B' and the gear F.

Within the stock is a barrel, G, and within the barrel is a core, H, Figs. 15, 16, 19, 20. The stock is interiorly grooved longitudinally, and these grooves receive feathers $f^6$ on the barrel G. (See Figs. 1 and 2.) Thus the barrel will rotate with the stock, and yet be free to reciprocate thereon. The barrel and core project rearwardly beyond the stock, and upon the projecting portion of the barrel a head, I, is attached by means of a key, K³. (Shown in Figs. 15 and 16.)

The core H, as seen in Figs. 15, 22, 10, 11, 12, is grooved at $h$ $h'$ to receive the strand-wires. These grooves $h$ $h'$ are those with which the grooves $b^6$ $b^7$ are respectively in coincidence, and the strand-wires (represented by the broken lines J J', Fig. 1) are drawn through the machine as follows: From the reel E the wire J leads around the pulleys $j$ $j'$, Figs. 1, 22, into and through the groove $b^6$ in the core-bar $b^4$, and thence into and through the groove $h$ in the core H; and from the reel E' the wire J' leads around the pulleys $j^2$ $j^3$ $j^4$ into and through the groove $b^7$ in the core-bar $b^4$, and thence into and through the groove $h'$ in the core H. The barb-wire (represented by the broken line J², Fig. 1) leads from the reel E² around the pulleys $j^5$ $j^6$, Figs. 1, 26, into and through a groove, $c$, in the stock C; thence through a tube, K, (adapted to slide upon the stock, as hereinafter described,) and thence through a perforation, $i$, in the head I, and finally into and through a curved tube, L, upon the head I. As the tube L is liable to wear and needs renewing from time to time, the tube is made to be confined upon the head I by means of the removable block or cap $l$, which partially encircles the tube, and is fastened to the head by means of the flange $l'$ and screws $l^2$, Fig. 9. A spring-dog, $l^3$, prevents the barb-wire from slipping backward in the tube L. The barb-wire is fed by means of the mechanism shown in Figs. 1, 2, 15, 17, 18, 19, 20. The tube K is adapted to be moved forward and backward on the stock C. When it moves backward—that is, toward the head I—it carries the barb-wire along with it, and when it moves in the opposite direction the barb-wire remains stationary so far as the longitudinal movement is concerned. The tube is provided with the device $k$, consisting of the pivoted cams $k'$ $k'$, between which the barb-wire is held in the rearward movement of the tube, and which open sufficiently in the forward movement of the tube to enable the tube to move without drawing the wire with it.

The movement of the tube K is effected as follows:

M represents a curved inclined plane. The tube K is provided with the post $k^2$, on which is a friction-roller, $k^3$. As the stock rotates in the bearing $d$, the roller $k^3$ comes against the inclined plane M, the effect of which is to cause the tube K to move rearward, as described. As soon as the roller passes the inclined plane a spring, $k^4$, acts to move the tube K forward again. The gear F engages with the gear N upon the shaft N'. This shaft turns in the bearings $n$ $n$, and is provided with the grooved cam $n'$, the pinion $n^2$, the bevel-pinion $n^3$, and the cam $n^4$. These last-named parts—namely, the shaft N', grooved cam $n'$, and pinion $n^2$—are employed to operate the compressors and to slide the head, and for that purpose it is necessary that the gear N should make but one revolution to two revolutions of the gear F; but if the tube K were moved forward every time the gear F revolved, the barb-wire would be fed too fast. To prevent this the inclined plane M, Figs. 17, 18, 19, 20, is adapted to act upon the roller $k^3$ every other revolution of the gear F and stock C, and this in turn is accomplished, preferably, as follows: The inclined plane is supported upon an arm, $m$, which works upward and downward in a guide, $m'$, that is upon the bed-plate $d'$ of the machine. The lower end of the arm, through the friction-roller $m^2$, rides upon the cam $n^4$, and as the shaft N' rotates, the inclined plane M rises and falls, as shown in Figs. 19 and 20, respectively. When elevated, the roller $k^3$ comes in contact with it, as seen in Fig. 19, and the tube K is moved rearward; but when the inclined plane is lowered, as in Fig. 20, the tube is not affected by it and the barb-wire is not fed.

The office of the grooved cam $n'$ is to effect the reciprocation of the parts immediately connected with the head I and employed in forming and compressing the barb.

O, Figs. 1, 21, represents a slide adapted to be moved longitudinally upon the bed-plate $d'$. The slide is provided with a stud, $o$, which engages in the cam $n'$, and as the cam rotates with the shaft N' the slide is moved upon the bed-plate. A pinion, $o'$, is attached to a shaft, $o^2$, which rotates in the bearings $o^3$, Figs. 1 and 21, in the slide O. The pinion $o'$ engages with the pinion $n^2$. The uprights $o^4 o^4$, attached to the slide at each side of the pinion $o'$, support the boxing $o^5$ which surrounds the head I. This serves to connect the slide O, head I, barrel G, and core H, and all these last-named parts, in consequence, reciprocate with the slide. The pinion $n^2$ also moves upon the shaft N' with the pinion $o'$ and slide O. The hub $n^5$ of the pinion $n^2$ is grooved, and a hanger, $o^6$, attached to the slide O, engages in the groove, causing the pinion $n^2$ to follow the slide O; but the feather $n^6$ causes the pinion $n^2$ to rotate with the shaft N' and the motion of the latter to be imparted to the pinion $o'$ and shaft $o^2$. The last-named shaft is provided with the cams $o^7 o^8$, Figs. 4, 6.

P P represent hangers dependent from the slide O. At their lower end the hangers support a bearing, $p$, to which a pair of compressor-arms, Q Q, are hinged. The arms Q Q extend upward and opposite the center of the head I, and support, respectively, the compressors $q q'$, Figs. 1, 2, 3, 4, 7, 13, 14. The arms Q Q, by means of the straps $q^2 q^3$, are respectively connected with the cams $o^7 o^8$. The rotation of the shaft $o^2$ therefore operates to swing the arms Q Q upon the bearing $p$, and to close the compressors toward and open them apart from each other. The compressors assist in the bending of the barb-wire upon the strand-wires, and one of them is furnished with a knife, $q^4$, Figs. 4, 7, 5, 13, for cutting off the barb-wire.

The operation is as follows: The barbed wire, as made, is drawn around the wheel R, Figs. 1, 2, 3, and is coiled on the spool S, a belt, $s$, leading from the pulley $s'$ on the shaft N' to the pulley $s^2$ on the spool-shaft $s^3$, serving to rotate the spool, and the bevel-gear, $n^3$, engaging with a gear, $r$, Figs. 1, 2, upon the shaft $r'$, which also carries a small pinion, $r^2$, that engages with the large gear $r^3$ upon the wheel-shaft $r^4$. As the strands J J' are drawn through the core H the barb-wire passes between them, as shown in Figs. 11 and 12, successively. The compressor $q$ then closes into the position shown in Fig. 13, and the head I continuing to rotate, as indicated by the arrow in Fig. 14, the barb-wire is intertwined upon the strand-wires in the manner shown in Fig. 13. The two compressors then close nearer to each other, the compressor $q'$, through the knife $q^4$, operating against the knife $k^3$ to sever the barb-wire, and the two compressors operating to set the barb closely against the strand-wires, as shown in Fig. 14. As each barb is formed, the head I, barrel G, core H, and compressor mechanism are, through the action of the grooved cam $n'$, drawn forward, enabling the barbs to be formed without arresting the movement of the various wires. The barbed wire is drawn over the wheel R and wound upon the spool S. The spool-shaft $s^3$, being parallel with the shaft N', can be driven by the belt $s$, as described, and as the belt can slip when a certain undue tension comes upon it, (as is liable in spooling barbed wire,) the winding operation can proceed without endangering the machine.

$E^3$ represents a tension device. A handle, $e$, is attached to a spindle, $e'$, that turns in a suitable bearing—say in the flier B—and is provided with a projection, $e^2$. By turning the spindle the projection is pressed against the side of the reel, and thereby made to retard its rotation, and in consequence exert a tension upon the wire.

The device, by means of the pawl and ratchet shown, can be held in any desired position. All the reels are similarly provided with a tension device. The head I has an adjustable flange, $i^2$, which, as the boxing $o^5$ wears, can be set up against the boxing. The springs $q^8 q^8$ act to open the compressors as soon as the arms Q Q are released by the cams $o^8 o^7$.

On the tube K, between the frame $k$ and the rear bearing of the tube, a collar, $t'$, having a set-screw, is shown. Its function is to regulate the length of the barb. By loosening the set-screw and moving the collar toward the frame $k$, and then tightening the set-screw, a longer barb can be made. Setting the collar in the opposite direction enables the barb to be made shorter. The double-threaded shaft acts in the usual manner—that is, the customary switch in the boxing of the shaft (not shown) engages in the thread of the shaft, and thereby causes the shaft and reel to be reciprocated endwise in the shaft bearings, and the wire, in consequence, to be properly wound upon the reel. The set-screw on the part $l$ is to clamp the guide (not shown) in the part $l$. The set-screw on the head I serves to secure the knife $k^3$, which rotates with the head. This knife is shown in Figs. 8, 9, and also in cross-section in Fig. 16.

In the present machine the core is adjustable longitudinally in the barrel, in order that the core, as it becomes worn away, may be set farther out in the barrel. When the core has been thus adjusted, it is fastened in the barrel by a suitable set-screw passing through the barrel and bearing upon the core, and when thus adjusted and fastened the core and barrel are for the time being rigidly connected, so that the core and barrel shall reciprocate as one piece, and they remain thus rigidly connected until it becomes necessary to readjust the core in the barrel. The aim and advantage of thus moving the core and barrel as one piece are that the outer end of the core shall always be in its proper place at the time of the forming of the barb. If the core projects too far from the barrel, it comes in the way of the knife, and unless it projects far enough from the barrel the barb is not properly formed upon the strand-wires. In the present case the core and barrel can be readily relatively adjusted, and the core can be kept always in the same place with reference to the barrel.

I claim—

1. The combination of the flier B and the reels E E' E², said reels being arranged centrally in the flier, and said flier and reels being perforated centrally to admit the strand-wires.

2. The combination of the flier B, the stock C, and the tubes $b'$ $b^3$, and core $b^4$, substantially as described.

3. The combination of the flier B, the stock C, the tubes $b'$ $b^3$, the core $b^4$, and the reels E E' E², substantially as described.

4. The combination of the flier B, the reel E', and the tension device E³, substantially as described.

5. The combination of the flier B, the stock C, the tubes $b'$ $b^3$, the core $b^4$, the barrel G, and the core-bar H, substantially as described.

6. The combination of the flier B, the grooved core $b^4$, and the catch $b^5$, as and for the purpose described.

7. The combination of the flier B, the reels E E', pulleys $j$ $j'$ $j^2$ $j^3$ $j^4$, and the grooved core $b^4$, as and for the purpose described.

8. The combination of the rotating stock C, the tube K, the dogs $k'$ $k'$, the parts $k^2$ $k^3$, and the inclined plane M, and spring $k^4$, substantially as described.

9. The combination of the stock C, the tube K, the dogs $k'$ $k'$, the parts $k^2$ $k^3$, and the inclined plane M, said inclined plane having a reciprocating movement, as and for the purpose described.

10. The combination of the inclined plane M, the arm $m$, the guide $m'$, the shaft N', and the cam $n^4$, as and for the purpose described.

11. The combination of the stock C, the tube K, the inclined plane M, the arm $m$, the guide $m'$, the shaft N', the cam $n^4$, and the spring $k^4$, substantially as described.

12. The head I, perforated at $i$, and provided with the removable tube L, said tube being an extension of said perforation, but entirely beyond it, substantially as and for the purpose described.

13. The combination of the head I and the pivoted dog $l^3$, as and for the purpose described.

14. The combination of the reciprocating slide O, the hanger $o^6$, the pinions $n^2$ $o'$, and the shafts N' $o^2$, substantially as described.

15. The combination of the reciprocating slide O, the head I, the barrel G, the core H, and the compressors $q$ $q'$, the compressor $q'$ having the knife $q^4$, the knife $k^3$ on the head I, and the two compressors acting to compress the barb closely upon the strand-wires, substantially as described.

16. The combination of the head I, having a knife, $k^3$, the barrel G, core H, the swinging arms Q Q, and the compressors $q$ $q'$, the compressor $q'$ having the knife $q^4$, and the two compressors acting to compress the barb upon the strand-wires, substantially as described.

17. The combination of a pair of reciprocating compressors, $q$ $q'$, the knife on one of these compressors, the head I, and the knife on the end of same, substantially as described.

18. The combination of the shaft $o^2$, the cams $o^8$ $o^7$, the straps $q^3$ $q^2$, and the hinged arms Q Q, as and for the purpose described.

19. The combination of the shaft $o^2$, the cams $o^8$ $o^7$, the straps $q^3$ $q^2$, the arms Q Q, and the springs $q^8$ $q^8$, substantially as described.

GODFREY H. LASAR.

Witnesses:
  C. D. MOODY,
  CHARLES PICKLES.